United States Patent [19]
Becker et al.

[11] 3,928,968
[45] Dec. 30, 1975

[54] POWER TRANSMISSION

[75] Inventors: Kenneth F. Becker, Clarkston; Nicholas F. Pedersen, Farmington, both of Mich.

[73] Assignee: Sperry Rand Corporation, Troy, Mich.

[22] Filed: Oct. 4, 1974

[21] Appl. No.: 512,263

[52] U.S. Cl. .................. 60/403; 60/428; 91/411 A
[51] Int. Cl.² .................. F15B 11/22; F15B 20/00
[58] Field of Search .......... 60/403, 405, 428, 484, 60/486; 91/411 R, 411 A

[56] References Cited
UNITED STATES PATENTS

| | | | |
|---|---|---|---|
| 2,426,374 | 8/1947 | Sprake | 60/403 |
| 3,640,185 | 2/1972 | Korsak | 91/411 A |

Primary Examiner—Edgar W. Geoghegan
Attorney, Agent, or Firm—Theodore Van Meter

[57] ABSTRACT

A dual integrated electro hydraulic actuator package for remotely controlling the position of an aircraft control surface has both its input power and its input command signals supplied solely by wires from remote locations. The package encloses two complete and separate hydraulic actuators mechanically connected together to drive a load and includes duplicate sets of electro hydraulic drive components and electro hydraulic control components, one for each actuator. The load on the actuators is divided equally by means of metering valves, one for each direction of actuation, which compare the pressures in the two actuators and adjust the control system for the driving components to maintain these loads equal. Blocking valves are provided to cut out the action of the metering valves whenever one or the other of the electro hydraulic driving means is disabled, thus permitting the other actuator and its driving means to carry the entire load.

2 Claims, 3 Drawing Figures

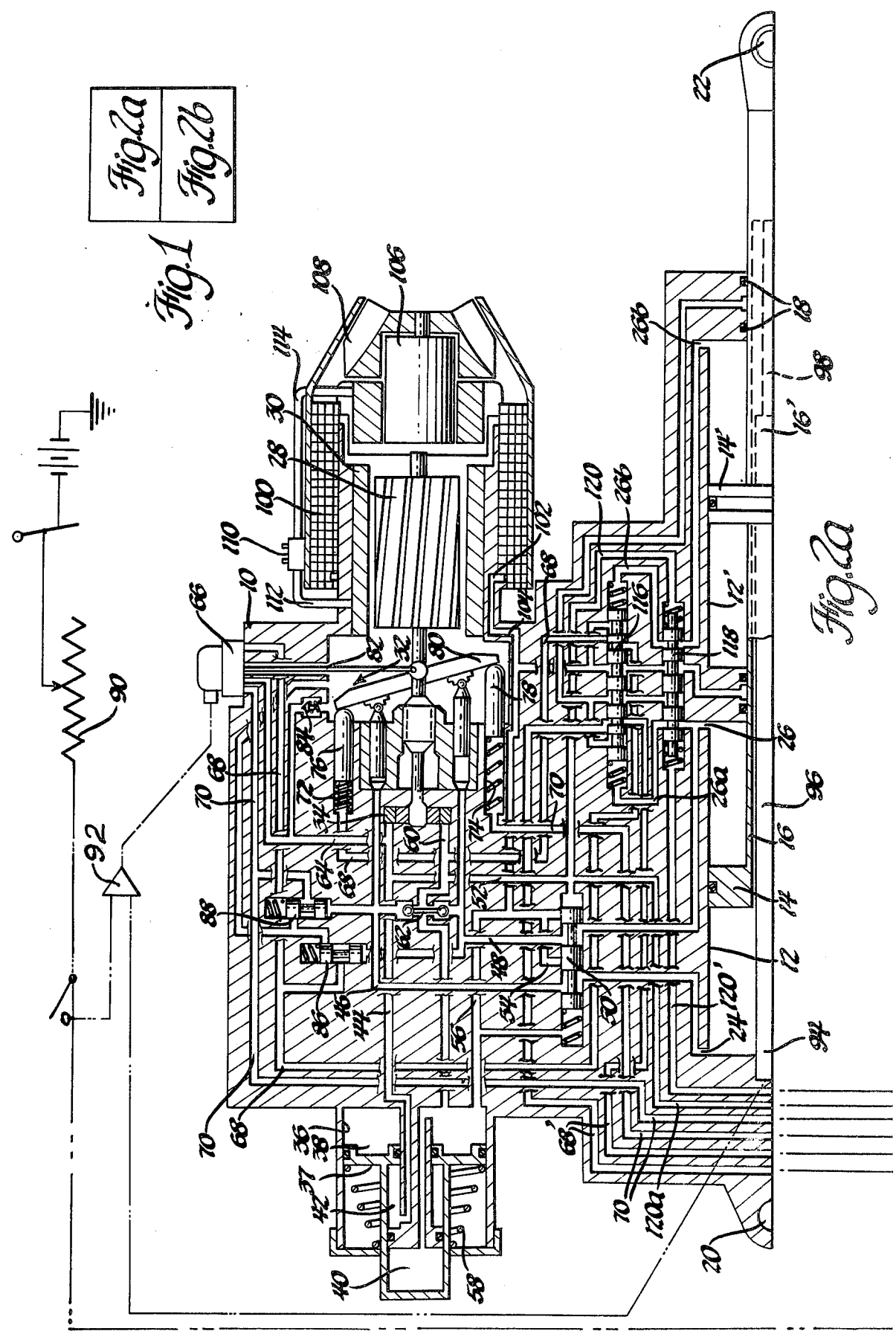

POWER TRANSMISSION

In the operation of large aircraft, it is necessary to provide power amplification at the aircraft control surfaces of the commanding input motions provided by either the pilot in manual flight or by an automatic pilot. Commonly, such systems have comprised one or more central hydraulic systems with an engine driven pump supplying high pressure fluid through long conduits to one or more hydraulic actuators at the control surfaces. Follow-up control is usually provided by an electrical summing circuit controlling an electro hydraulic servo valve which in turn controls the supply of fluid to the actuator. Some of the drawbacks of such systems are the weight of the long hydraulic lines in large aircraft and the vulnerability of such systems to failure in the event of accidental disruption of a hydraulic line.

In the co-pending application of Becker, Pedersen and Lambeck, Ser. No. 501,311, filed Aug. 28, 1974, there is disclosed an integrated actuator package capable of overcoming these disadvantages and forming the key part of what may be termed a fly-by-wire and a power-by-wire system. In applications as vital to safety as the control of aircraft surfaces, some protection is required against malfunction or failure of anything in the actuator package and for this purpose it is expedient to provide dual packages, either one of which can carry out alone all of the operating functions normally required. However, since both actuator packages are mechanically connected to the same load; that is the aircraft control surface, when one package fails it becomes an extra load on the surviving package and would inhibit its ability to move the load.

This invention aims to provide a dual integrated actuator package in which during normal operation the load is equally divided between the two halves of the package and in which, upon disablement of one half of the package, the function and capability of the surviving half are not substantially impaired.

These objects are achieved by the provision of a dual integrated actuator package comprising dual hydraulic actuators mechanically connected together and to a load to be selectively positioned by remote control; dual electric prime movers, dual reversible variable displacement hydraulic pumps driven separately by the prime movers and each separately driving an actuator, and dual electro hydraulic servo controllers, each controlling separately the displacement of a hydraulic pump, having that improvement which comprises a pair of metering valve means, one being responsive oppositely to the pressures in the actuators to modulate the action of each servo controller for one direction of actuator motion, the other being responsive oppositely to pressures in the actuators to modulate the action of each servo controller for the other direction of actuator motion whereby the load is divided equally between the actuators.

IN THE DRAWINGS

FIG. 1 indicates the relationship of FIGS. 2a and 2b.

FIG. 2a is a diagrammatic view of one half of an integrated actuator package incorporating a preferred form of the present invention.

Figure 2B:
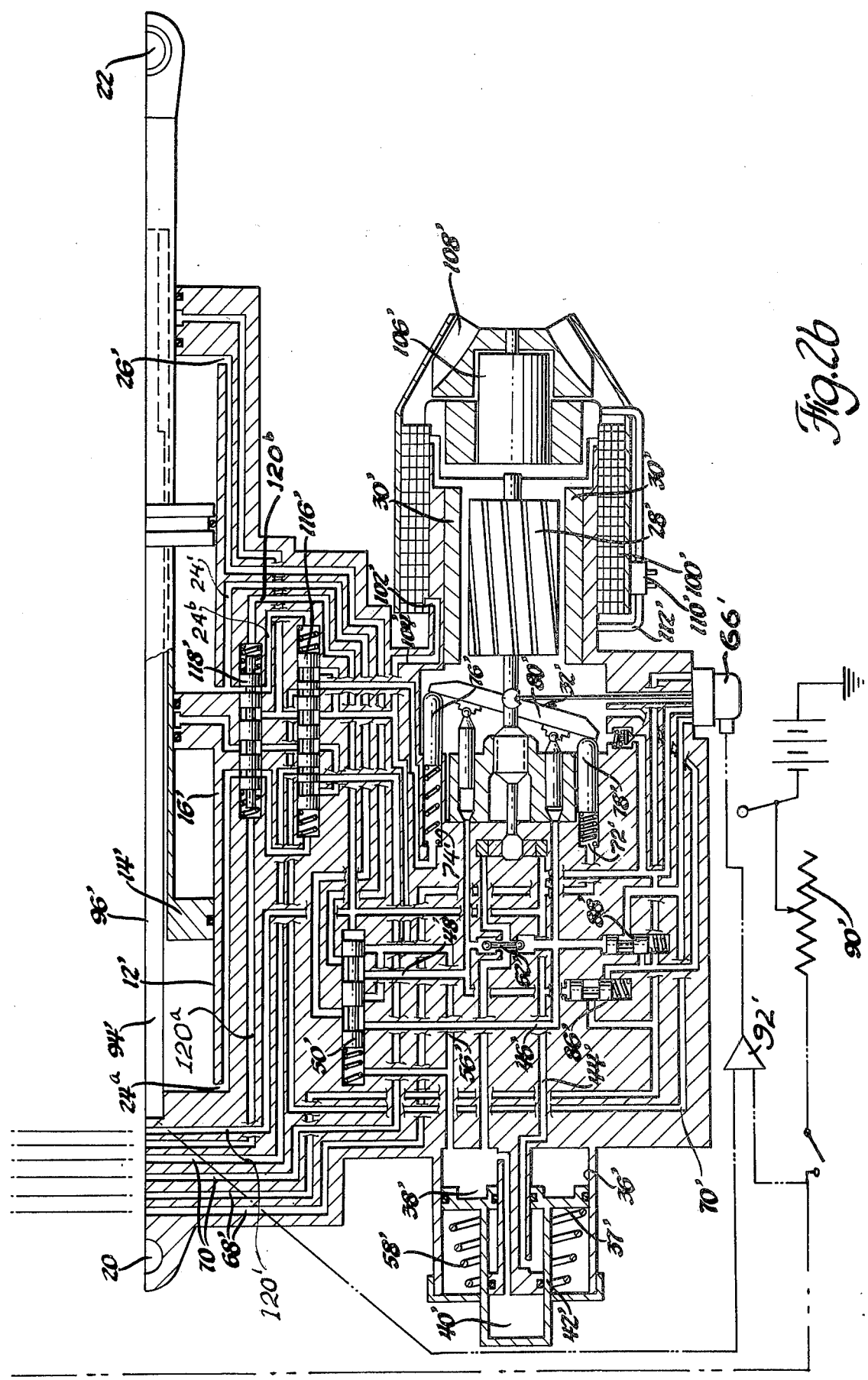
FIG. 2b is a similar diagrammatic view of the other half.

Referring now to FIG. 2a, the housing 10 represents diagrammatically an enclosing housing of any suitable configuration which totally encloses the necessary power and control elements of one of the two dual actuators with the only elements moving through the wall of the package being the output member of the actuator and a movable member of the reservoir, both of which are provided with sliding seals. The actuator comprises a cylinder 12 having a differential piston 14 with its piston rod 16 slidable therein, the piston rod 16 extends into a second cylinder 12' and connects with a second actuator piston 14' having its piston rod 16' extending through the wall with the slidable seals 18. The housing 10 may be pivotally secured to the air frame as at 20, and the piston rod 16' may be connected to the actuating arm of an aircraft control surface as at 22. The actuator is moved by admitting and exhausting hydraulic fluid from either the conduits 24 and 26 or to and from the conduits 24' (see FIG. 2b) and 26' or to and from both sets of conduits.

An electric motor prime mover 28 having a stator 30 runs in a body of hydraulic fluid within the housing 10 and is connected to drive mechanically a reversible variable displacement piston pump 32 and an auxiliary pump 34 which supplies fluid for control purposes. A reservoir 36 has a slidable differential piston 37 therein which separates the reservoir provided by the two chambers 38 and 40 from the atmosphere and from a pressurizing chamber 42 which is connected through conduit 44 to the outlet of the auxiliary pump 34.

The main pump 32 is connected by conduits 46 and 48 through the conduits 24 and 26 to the actuator cylinder 12 for supplying fluid to one end or the other thereof as determined by the displacement setting of the pump 32. A bypass valve 50 is spring loaded to the right and pressure operated to the left from the auxiliary pump by means of a conduit 52. In the normal position as illustrated, the valve 50 closes a bypass conduit 54 and a reservoir conduit 56 from access to the actuator cylinder 12.

In the event of leakage from the system at the seals 18 or anywhere else, resulting in starvation of the auxiliary pump 34 at its inlet conduit 60, or if for any reason its output pressure falls, this will allow bypass valve 50 to shift to the right, opening the bypass 54 and the reservoir conduit 56 so that makeup fluid can be delivered to the actuator and its associated passages. This restores pressure at the outlet of the auxiliary pump and again closes the bypass valve 50. If this does not occur for any reason, then the bypass 54 remains open to allow the load to float. An auxiliary spring 58 may be provided to bias the piston 37 to the right in the event of total loss of auxiliary pump pressure. A shuttle valve 62 provides access for reservoir replenishing through conduit 60 to whichever one of the main conduits 46 and 48 is at a lower pressure than the other at any time.

The auxiliary pump 34 also supplies control fluid through a conduit 64 to an electro hydraulic servo valve 66. The valve 66 delivers this fluid at modulated pressures to a pair of servo motor circuits 68 and 70 which lead to a pair of servo cylinders 72 and 74 for controlling a pair of pistons 76 and 78 which control the swash plate or displacement adjusting mechanism 80 of the pump 32. A mechanical connection 82 feeds back the position of the swash plate 80 to the servo valve 66 and introduces a signal there indicative of the velocity of the piston 14. The pistons 76 and 78 are provided with small central lubricating passages to the swash plate but are not large enough to affect the servo motor control by the servo valve 66. A pressure relief valve may be provided as at 84 for limiting the pressure of the auxiliary pump 32.

No relief valves are provided for the main circuit conduits 46 and 48, but instead pressure responsive valves 86 and 88 are provided for bypassing to tank the pressure in lines 68 and 70 whenever the pressure in line 48 or 46 respectively rises above a predetermined value.

An electrical command controller indicated at 90 feeds a command signal to an input summer 92 which receives a feedback signal from a linearly variable differential transformer 94 at the output actuator piston 16. This transformer comprises a stator 96, the current in which is varied by a movable input member 98 connected to move with the piston rods 16 and 16'.

Heat losses in the system may be dissipated by a liquid-to-air heat exchanger 100 which is connected into the auxiliary pump return circuit, receiving fluid from the sump of pump 32 and through the gap of motor 28 and exhausting back to the reservoir through a conduit 102–104. The heat exchanger is preferably positioned around the stator of the electric motor 28, the heat exchanger being air cooled by means of an electric motor 106 and a fan 108. Other sources of cooling air may be used when available such as ram air in an aircraft while in flight, leaving the motor 106 idle except when on the ground. An electric power terminal 110 supplies the motors 28 and 106 through conductors 112 and 114.

The half of the actuator package illustrated in FIG. 2b is substantially identical to that illustrated in FIG. 2a and the corresponding parts carry the same numbers with a prime suffix. It is desirable, because the two actuator pistons 14 and 14' are connected together into a common load, that such load is carried equally by both halves of the whole package. It is also desirable that in the event one half of the package becomes disabled, the surviving half may carry the full load, but without any extra burden imposed by the disabled half.

For these purposes, a servo control conduit 68 leads through a metering valve 116 to the servo motor cylinder 72 of the main pump 32. The other servo control conduit 70 leads over to the other half where it passes through another metering valve 116' and returns back to the first half and to the other servo motor cylinder 74 of the main pump 32. The metering valve 116 is normally spring centered and is exposed at its opposite ends to the fluid pressure in the right-hand ends of the cylinders 12 and 12' through conduits 26a and 26b respectively. When centered, the valve 116 maintains open communication through conduits 68 and 68', between the servo valve 66 and the cylinder 72 on the one hand and between the servo valve 66' and the cylinder 72' on the other hand. Whenever these pressures tend to become unbalanced, the metering valve 116 shifts to the right or the left and restricts the appropriate passage 68 or 68', thus restoring the balance in the load carried by each half of the actuator package.

The blocking valve 118 is also spring centered and is exposed at its opposite ends through conduits 120 and 120' to the auxiliary pump pressures in the two halves of the actuator package. The purpose of the blocking valve 118 is to connect to the reservoir either the conduits 26 and 26a for the right-hand end of actuator cylinder 12 in case there is a failure of auxiliary pump pressure from the pump 34, or the conduits 26' and 26b for the right end of cylinder 12' in case there is a failure of auxiliary pump pressure at pump 34'. A conduit 120a connects a blocking valve 118' to the auxiliary pump 34 through conduit 52 and a conduit 120b connects the auxiliary pump 34' to the blocking valve 118'.

In describing the operation of one half of the actuator package, the operation of the other half will be understood by analogy. Thus, with the electric power supplied to the input terminal 110 and with command signals being provided by either command controller 90 or 90', the servo valve will regulate the position of the actuator piston 14 to correspond to the position commanded by so adjusting the swash plate 80 through the servo motors 72 and 74 that the main pump 32 delivers just that small amount of leakage make-up fluid to one side or the other of piston 14 which is needed to maintain its position against a resisting load applied to the aircraft control surface or other load at any instant. Should an error develop between the command signal from the controller 90 and the feedback signal from the transformer 94, the summer 92 will provide the appropriate input to the servo valve 66 for correction of that error in the manner well known in servo control systems. At other times during the many extended periods when no movement of the output actuator is necessary, the power requirements at the pump 32 are minimal.

The metering valve 116 monitors the pressures in the right-hand ends of the actuator cylinders 12 and 12' and when they become unbalanced interferes with the normal control of the servo pistons 76 and 76' by restricting one or the other of the conduits 68 and 68' unitl such pressures are again balanced. Similarly, the metering valve 116' maintains the pressures in the left-hand ends of cylinders 12 and 12' balanced by restricting the conduits 70 and 70'. Balancing pressures can be adjusted for an unbalanced or a balanced actuator by either a differential area spool in the valve or an adjustable centering spring.

The blocking valve 118 monitors the output pressures of the auxiliary pumps 34 and 34' and when the pressure of either falls to a very low value, the valve shifts to connect the right hand end of cylinder 12 or cylinder 12' to the other auxiliary pump. At the same time, the corresponding blocking valve 118' will shift to accomplish the same purpose for the left-hand end of cylinder 12 or cylinder 12'. Thus, when one half of the actuator package becomes disabled, its corresponding actuator cylinder is in effect bypassed through the auxiliary pump conduits, thus relieving any substantial extra load upon the surviving half of the actuator package.

We claim:

1. In a dual integrated actuator package comprising dual hydraulic actuators mechanically connected together and to a load to be selectively positioned by remote control, dual rotary electric prime movers, dual reversible variable displacement hydraulic pumps driven separately by the prime movers and each separately driving an actuator, and dual electro hydraulic servo controllers each controlling separately the displacement of a hydraulic pump, that improvement which comprises a pair of metering valve means, one being responsive oppositely to the pressures in the actuators to modulate the action of each servo controller for one direction of actuator motion, the other being responsive oppositely to pressures in the actuators to modulate the action of each servo controller for the other direction of actuator motion whereby the load is divided equally between the actuators.

2. An integrated actuator package as defined in claim 1 wherein each servo controller includes an auxiliary pump driven by a prime mover, and the package includes a pair of blocking valve means, each normally held in open position by the opposing pressures of the auxiliary pumps and effective when shifted by a loss of pressure at one auxiliary pump to block the action of one of the metering valve means.

* * * * *